(12) United States Patent
Abedini et al.

(10) Patent No.: US 11,937,311 B2
(45) Date of Patent: Mar. 19, 2024

(54) TECHNIQUES FOR NETWORK NODE CONFLICT RESOLUTION

(71) Applicant: QUALCOMM Incorporated, San Diego, CA (US)

(72) Inventors: Navid Abedini, Somerset, NJ (US); Luca Blessent, Whitehouse Station, NJ (US); Jianghong Luo, Skillman, NJ (US); Karl Georg Hampel, Hoboken, NJ (US); Tao Luo, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 157 days.

(21) Appl. No.: 16/947,663

(22) Filed: Aug. 11, 2020

(65) Prior Publication Data

US 2021/0051711 A1 Feb. 18, 2021

Related U.S. Application Data

(60) Provisional application No. 62/888,106, filed on Aug. 16, 2019.

(51) Int. Cl.
*H04W 74/08* (2009.01)
*H04W 16/10* (2009.01)
(Continued)

(52) U.S. Cl.
CPC ......... *H04W 74/085* (2013.01); *H04W 16/10* (2013.01); *H04W 28/16* (2013.01); *H04W 74/002* (2013.01)

(58) Field of Classification Search
CPC ... H04W 74/085; H04W 16/10; H04W 28/16; H04W 74/002; H04W 24/02
See application file for complete search history.

(56) References Cited

U.S. PATENT DOCUMENTS

2010/0216486 A1* 8/2010 Kwon ............... H04W 72/0426
455/452.2
2011/0116481 A1* 5/2011 Wang .................... H04W 16/16
370/336

(Continued)

OTHER PUBLICATIONS

Huawei, et al., "Resource Multiplexing Between Backhaul and Access in IAB", 3GPP Draft, 3GPP TSG RAN WG1 Meeting #96bis, R1-1903938, 3rd Generation Partnership Project (3GPP), Mobile Competence Centre, 650, Route Des Lucioles, F-06921 Sophia-Antipolis Cedex, France, vol. RAN WG1, No. Xi'an, China, Apr. 8, 2019-Apr. 12, 2019, Apr. 7, 2019 (Apr. 7, 2019), XP051699371, 12 Pages, Retrieved from the Internet: URL: http://www.3gpp.org/ftp/Meetings%5F3GPP%5FSYNC/RAN1/Docs/R1%2D1903938%2Ezip, [retrieved on Apr. 7, 2019], chapter 2, chapter 4.

(Continued)

*Primary Examiner* — Dinh Nguyen
(74) *Attorney, Agent, or Firm* — Harrity & Harrity, LLP

(57) ABSTRACT

Various aspects of the present disclosure generally relate to wireless communication. In some aspects, a control node may receive a resource management indication from a network node to identify a resource utilization with communications of the network node; determine, based at least in part on the resource management indication, a collision management configuration for the network node; and transmit information associated with the collision management configuration based at least in part on the determination of the collision management configuration. Numerous other aspects are provided.

30 Claims, 8 Drawing Sheets

(51) Int. Cl.
*H04W 28/16* (2009.01)
*H04W 74/00* (2009.01)

(56) References Cited

U.S. PATENT DOCUMENTS

| | | | | |
|---|---|---|---|---|
| 2011/0212731 A1* | 9/2011 | Lee | ............... | H04W 28/26 |
| | | | | 455/450 |
| 2012/0015659 A1* | 1/2012 | Kalyani | ............ | H04W 72/085 |
| | | | | 455/450 |
| 2014/0161070 A1* | 6/2014 | Chang | ............ | H04W 74/008 |
| | | | | 370/329 |
| 2015/0358959 A1* | 12/2015 | Meshkati | ............ | H04W 24/02 |
| | | | | 370/329 |
| 2019/0014592 A1 | 1/2019 | Hampel et al. | | |
| 2019/0159277 A1* | 5/2019 | Zhu | ............... | H04W 92/12 |

OTHER PUBLICATIONS

International Search Report and Written Opinion—PCT/US2020/070403—ISAEPO—dated Oct. 29, 2020.

Nokia, et al., "Mechanisms for Resource Multiplexing Among Backhaul and Access Links", 3GPP Draft, 3GPP TSG RAN WG1 #96bis, R1-1904642 IAB Resource Allocation, 3rd Generation Partnership Project (3GPP), Mobile Competence Centre, 650, Route Des Lucioles, F-06921 Sophia-Antipolis Cedex, France, vol. RAN WG1, No. Xi 'an. China, Apr. 8, 2019-Apr. 12, 2019, Apr. 7, 2019 (Apr. 7, 2019), XP051699851, 17 Pages, Retrieved from the Internet: URL: http://www.3gpp.org/ftp/Meetings%5F3GPP%5FSYNC/RAN1/Docs/R1%2D1904642%2Ezip, [retrieved on Apr. 7, 2019], chapter 3, chapter 4.

Qualcomm Incorporated: "IAB Resource Management", 3GPP Draft, 3GPP TSG RAN WG1 Meeting #94, R1-1809444, 3rd Generation Partnership Project (3GPP), Mobile Competence Centre, 650, Route Des Lucioles, F-06921 Sophia-Antipolis Cedex, France, vol. RAN WG1, No. Gothenburg, Sweden, Aug. 20, 2018-Aug. 24, 2018, Aug. 17, 2018 (Aug. 17, 2018), XP051516809, 6 Pages, Retrieved from the Internet: URL: http://www.3gpp.org/ftp/tsg%5Fran/WG1%5FRL1/TSGR1%5F94/Docs/R1%2D1809444%2Ezip [retrieved on Aug. 17, 2018], pp. 2-5, 2.1 Baseline Approach: Semi-Static Resource Partitioning p. 5, 2.2 Enhanced Approach: Dynamic Resource Coordination Figures 2, 4, 5, Sections 2-3, paragraphs [0001]-[0002], p. 2. line 7, paragraph 2.1-line 15 p. 3; figure 2 Observation 1, p. 3.

* cited by examiner

TECHNIQUES FOR NETWORK NODE CONFLICT RESOLUTION

CROSS-REFERENCE TO RELATED APPLICATION

This Patent Applications claims priority to U.S. Provisional Patent Application No. 62/888,106, filed on Aug. 16, 2019, entitled "TECHNIQUES FOR NETWORK NODE CONFLICT RESOLUTION," and assigned to the assignee hereof. The disclosure of the prior Applications is considered part of and is incorporated by reference into this Patent Applications.

FIELD OF THE DISCLOSURE

Aspects of the present disclosure generally relate to wireless communication and to techniques and apparatuses for network node conflict resolution.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a control node, may include receiving a resource management indication from a network node to identify a resource utilization with communications of the network node; determining, based at least in part on the resource management indication, a collision management configuration for the network node; and transmitting information associated with the collision management configuration based at least in part on the determination of the collision management configuration.

In some aspects, the collision management configuration is at least one of a new resource configuration, a modified resource configuration, a new communication configuration, a modified communication configuration, a new conflict resolution rule, or a modified conflict resolution rule. In some aspects, transmitting the information identifying the collision management configuration includes transmitting the information to at least one of the network node, a parent network node of the network node, a child network node of thee network node, or a neighbor network node of the network node. In some aspects, the resource management indication identifies at least one of a resource conflict detected by the network node, a communication capability of the network node, a time interval associated with the resource conflict, or a number of resource conflicts.

In some aspects, the method includes detecting satisfaction of a conflict criterion; and requesting a report identifying the resource utilization based at least in part on the detection of the satisfaction of the conflict criterion. In some aspects, receiving the resource management indication includes receiving the resource management indication as a response to the request of the report identifying the resource utilization. In some aspects, the resource management indication includes an indication of at least one of a type of resource associated with a conflict, an identity of a parent node of the network node, or a recommendation for the collision management configuration.

In some aspects, the resource management indication is received via at least one of a radio resource control message or an F1-AP interface message. In some aspects, receipt of the resource management indication is based at least in part on satisfaction of the conflict criterion. In some aspects, the conflict criterion is associated with at least one of a minimum time interval, or a minimum number of resource conflicts.

In some aspects, a method of wireless communication, performed by a network node, may include determining a resource utilization for allocated resources; transmitting, to a control node, a resource management indication identifying the resource utilization; and receiving, from the control node, information identifying a collision management configuration as a response to the resource management indication.

In some aspects, the collision management configuration is at least one of a new resource configuration, a modified resource configuration, a new communication configuration, a modified communication configuration, a new conflict resolution rule, or a modified conflict resolution rule. In some aspects, the resource management indication identifies at least one of a resource conflict detected by the network node, a communication capability of the network node, a time interval associated with the resource conflict, or a number of resource conflicts. In some aspects, the method includes receiving, from the control node, a request for a report identifying the resource utilization; and transmitting the resource management indication as a response to the request for the report identifying the resource utilization.

In some aspects, the method includes detecting satisfaction of a conflict criterion; and transmitting the resource management indication based at least in part on the detection of the satisfaction of the conflict criterion. In some aspects, the conflict criterion is associated with at least one of a minimum time interval, or a minimum number of resource conflicts. In some aspects, the conflict criterion is determined based at least in part on a received indication from at least one of the control node or a parent node.

In some aspects, the conflict criterion is determined based at least in part on a preconfigured value. In some aspects, the resource management indication includes an indication of at least one of a type of resource associated with a conflict, an identity of a parent node of the network node, or a recommendation for the collision management configuration. In some aspects, the resource management indication is transmitted via at least one of a radio resource control message or an F1-AP interface message.

In some aspects, a control node for wireless communication may include memory and one or more processors operatively coupled to the memory. The memory and the one or more processors may be configured to receive a resource management indication from a network node to identify a resource utilization with communications of the network node; determine, based at least in part on the resource management indication, a collision management configuration for the network node; and transmit information associated with the collision management configuration based at least in part on the determination of the collision management configuration.

In some aspects, a network node for wireless communication may include memory and one or more processors operatively coupled to the memory. The memory and the one or more processors may be configured to determine a resource utilization for allocated resources; transmit, to a control node, a resource management indication identifying the resource utilization; and receive, from the control node, information identifying a collision management configuration as a response to the resource management indication.

In some aspects, a non-transitory computer-readable medium may store one or more instructions for wireless communication. The one or more instructions, when executed by one or more processors of a network node, may cause the one or more processors to receive a resource management indication from a network node to identify a resource utilization with communications of the network node; determine, based at least in part on the resource management indication, a collision management configuration for the network node; and transmit information associated with the collision management configuration based at least in part on the determination of the collision management configuration.

In some aspects, a non-transitory computer-readable medium may store one or more instructions for wireless communication. The one or more instructions, when executed by one or more processors of a network node, may cause the one or more processors to determine a resource utilization for allocated resources; transmit, to a control node, a resource management indication identifying the resource utilization; and receive, from the control node, information identifying a collision management configuration as a response to the resource management indication.

In some aspects, an apparatus for wireless communication may include means for receiving a resource management indication from a network node to identify a resource utilization with communications of the network node; means for determining, based at least in part on the resource management indication, a collision management configuration for the network node; and means for transmitting information associated with the collision management configuration based at least in part on the determination of the collision management configuration.

In some aspects, an apparatus for wireless communication may include means for determining a resource utilization for allocated resources; means for transmitting, to a control node, a resource management indication identifying the resource utilization; and means for receiving, from the control node, information identifying a collision management configuration as a response to the resource management indication.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
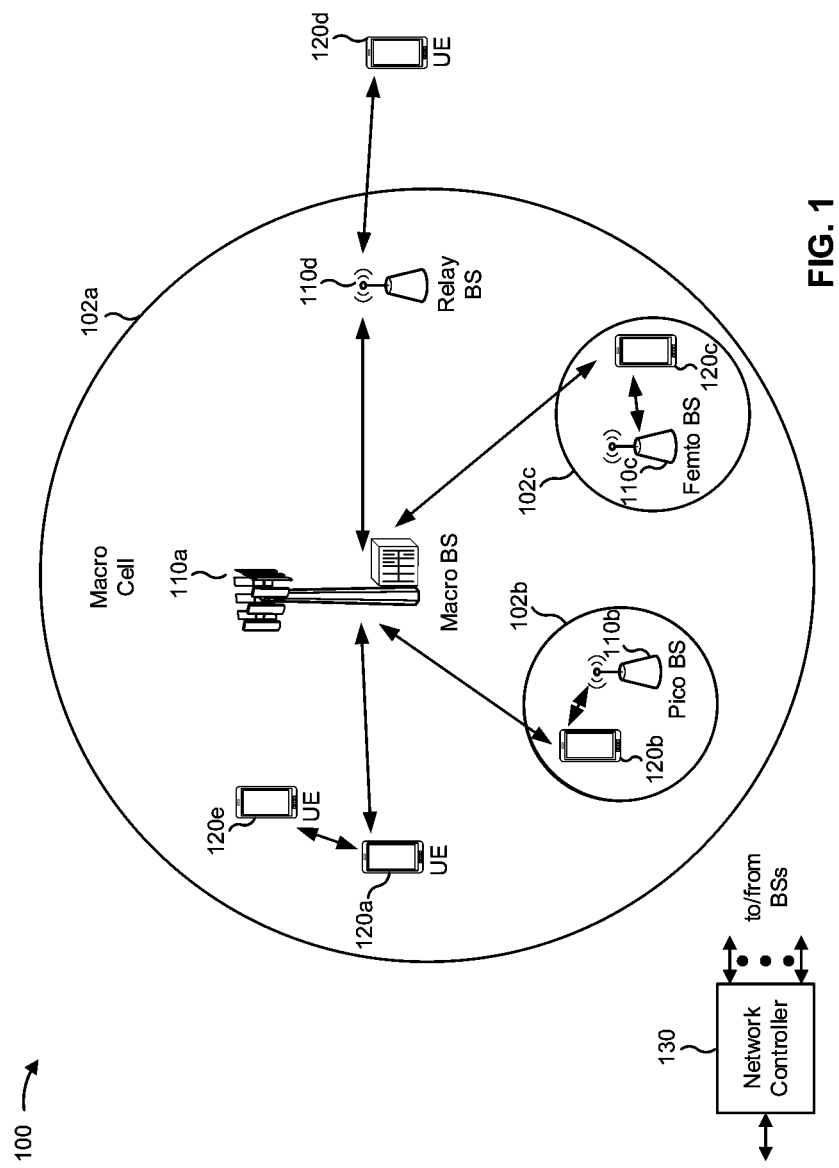
FIG. 1 is a diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
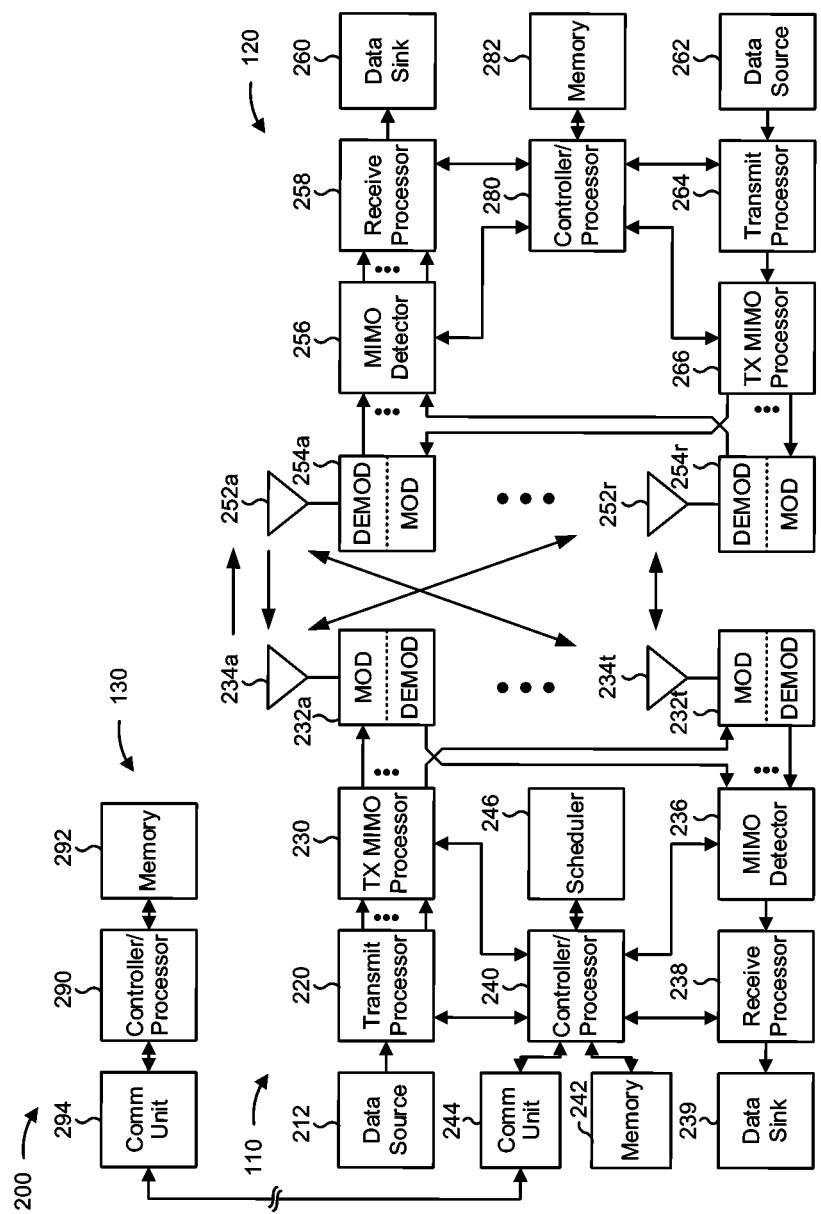
FIG. 2 is a diagram illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with network node conflict resolution, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 500 of FIG. 5, process 600 of FIG. 6, and/or other processes as described herein. A scheduler 246 may schedule UEs for data transmission on the downlink and/or uplink.

In some aspects, a control node (e.g., BS 110 or UE 120) may include means for receiving a resource management indication from a network node to identify a resource utilization with communications of the network node, means for determining, based at least in part on the resource management indication, a collision management configuration for the network node, means for transmitting information associated with the collision management configuration based at least in part on the determination of the collision management configuration, and/or the like. In some aspects, such means may include one or more components of BS 110 or UE 120 described in connection with FIG. 2, such as antenna 234, DEMOD 232, MIMO detector 236, receive processor 238, controller/processor 240, transmit processor 220, TX MIMO processor 230, MOD 232, antenna 234, controller/processor 280, transmit processor 264, TX MIMO processor 266, MOD 254, antenna 252, DEMOD 254, MIMO detector 256, receive processor 258, and/or the like.

In some aspects, a network node (e.g., BS 110 or UE 120) may include means for determining a resource utilization for allocated resources, means for transmitting, to a control node, a resource management indication identifying the resource utilization, means for receiving, from the control node, information identifying a collision management configuration as a response to the resource management indication, and/or the like. In some aspects, such means may include one or more components of BS 110 or UE 120 described in connection with FIG. 2, such as antenna 234, DEMOD 232, MIMO detector 236, receive processor 238, controller/processor 240, transmit processor 220, TX MIMO processor 230, MOD 232, antenna 234, controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Figure 3A:
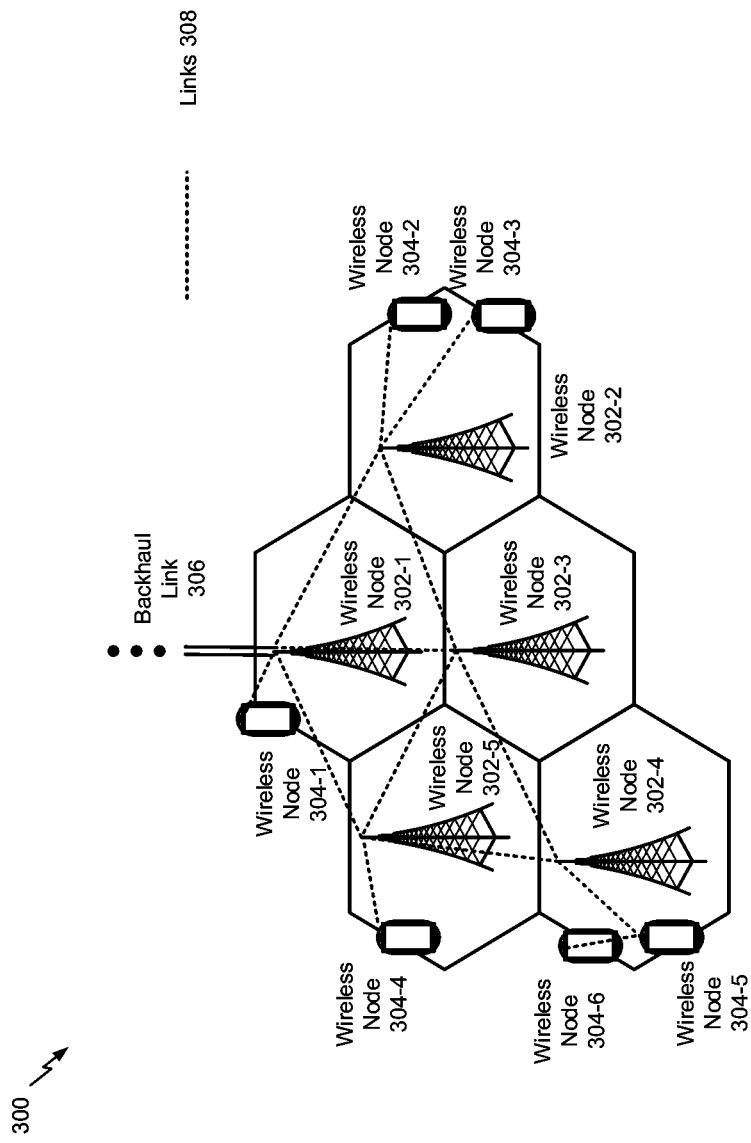
FIGS. 3A and 3B are diagrams illustrating an example of a network topology for a multi-hop network, in accordance with various aspects of the present disclosure.
Figure 3B:
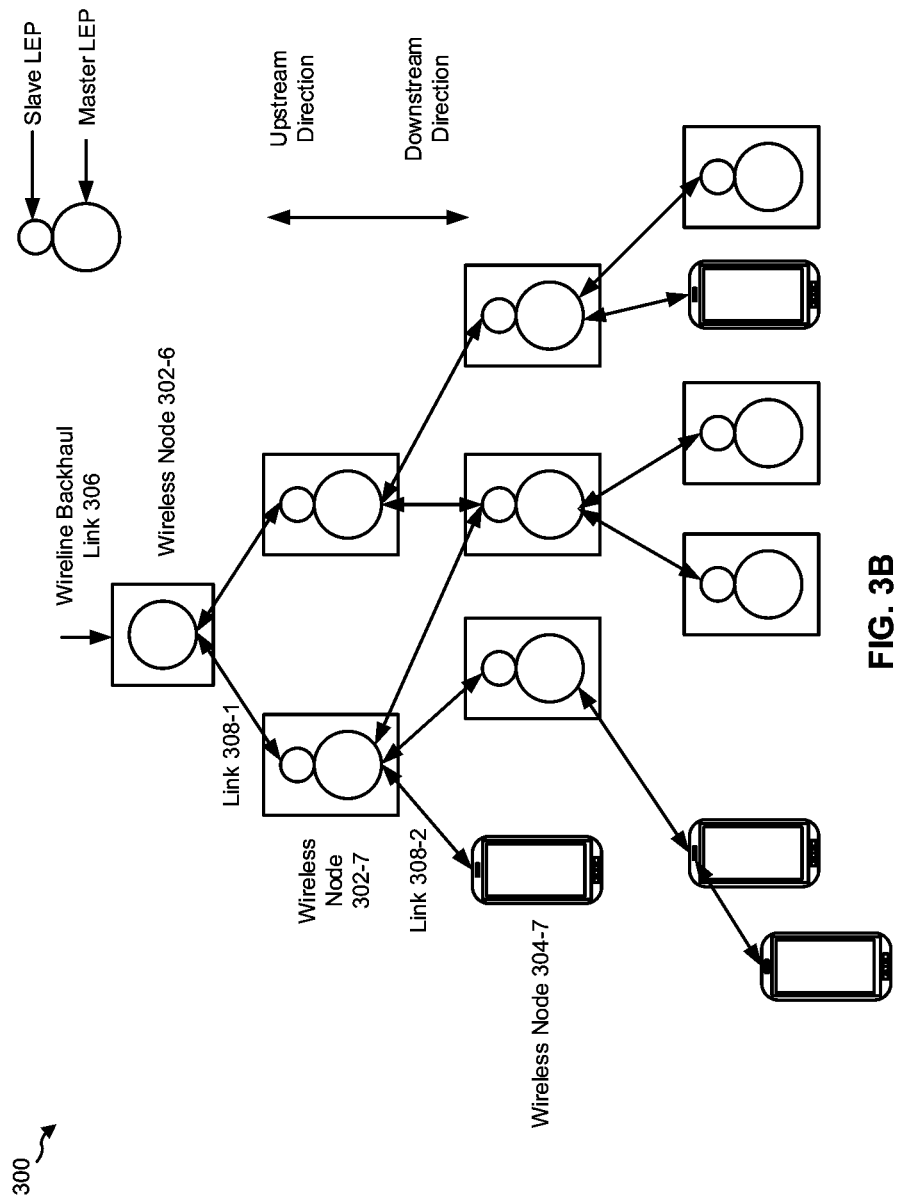

FIGS. 3A and 3B are diagrams illustrating an example 300 of a network topology for a network, in accordance with various aspects of the present disclosure. Self-backhauling or integrated access/backhaul (IAB) may be deployed to use a common set of resources for access traffic and backhaul traffic. For example, a first wireless node (e.g., BS 110a, BS 110d, and/or the like) may communicate backhaul traffic with a second wireless node and may communicate access traffic with a third wireless node. Although some aspects described herein are described in terms of an IAB deployment, some aspects described herein may be used in connection with other types of multi-hop networks.

As shown in FIG. 3A, example 300 may include multiple wireless nodes 302 (e.g., BSs) and multiple wireless nodes 304 (e.g., UEs), each of which may be network nodes, control nodes, and/or the like. At least one wireless node (e.g., wireless node 302-1, which may be a CU, such as BS 110a) may communicate with a core network via a backhaul link 306, such as a fiber connection, a wireless backhaul connection, a combination thereof, and/or the like. Wireless nodes 302 and 304 may communicate with each other using a set of links 308, such as a set of mmWave links; a 3G, 4G, 5G, etc. air interface; any future wireless network (e.g., a 6G wireless network); and/or the like.

As further shown in FIG. 3A, one or more wireless nodes 302 or 304 may communicate indirectly via one or more other wireless nodes 302 or 304. For example, data may be transferred from a core network to wireless node 304-4 via backhaul link 306, a link 308 between wireless node 302-1 (e.g., BS 110a) and wireless node 302-5 (e.g., which may be a DU, such as BS 110d), and a link 308 between wireless node 302-5 and wireless node 304-4 (e.g., which may be a UE, such as UE 120e).

As shown in FIG. 3B, wireless nodes 302 and wireless nodes 304 can be arranged in a hierarchical topology to enable management of network resources. Each link 308 may be associated with a master link end point (master LEP) and a slave link end point (slave LEP), which may define a hierarchy between wireless nodes 302 or 304. For example, a wireless node 302-6 (e.g., which may be a CU, such as BS 110a) may communicate with a wireless node 302-7 (e.g., which may be a DU, such as BS 110d, that is a child node or inferior node of wireless node 302-6) via link 308-1, which may be a parent link for wireless node 302-7. In this case, wireless node 302-6 may provide configuration information, such as a resource management indication, a collision management configuration, and/or the like. Similarly, wireless node 302-7 may communicate with wireless node 304-7 (e.g., which may be a UE, such as UE 120e, which may be a child node or inferior node of wireless node 302-7) via link 308-2, which may be a child link for wireless node 302-7. In this case, wireless node 302-6 may schedule for wireless node 302-7, which may schedule for wireless node 304-7 based at least in part on the hierarchy defined herein.

As indicated above, FIGS. 3A and 3B are provided as examples. Other examples are possible and may differ from what was described with respect to FIGS. 3A and 3B.

In some communications systems, network nodes may be deployed to provide integrated access and backhauling (IAB) in a multi-hop network. In IAB configurations, conflicts between communications on different links may result from distributed unit (DU) resource configurations in adjacent links. For example, periodic channel allocations (e.g., synchronization signal blocks (SSBs), random access channels (RACHs), and/or the like) may collide with resources assigned as not available for allocation. A resource conflict may include overlapping resources being allocated, such that a network node cannot transmit and/or receive using all of the overlapping resources, resulting in a dropped communication. For example, when overlapping resources are allocated to a network node with a half-duplex constraint and no space division multiplexing (SDM) or frequency division multiplexing (FDM) capabilities, and to a parent network node, the network node may not be capable of receiving and transmitting using the overlapping resources.

Additionally, or alternatively, a network node with an SDM or FDM capability may be allocated overlapping resources with conflicting directions, which may result in a conflict. Additionally, or alternatively, a network node with an SDM, FDM, or full-duplexing capability may be allocated overlapping resources, but may not be able to opportunistically use the SDM, FDM, or full-duplexing capability as a result of interference, which may result in a conflict. Additionally, or alternatively, a network node with multiple parent network nodes may have overlapping resources allocated to each parent network node, which may result in a conflict.

Some aspects described herein provide for network node conflict resolution. For example, a network node may provide a resource management indication, which identifies a resource utilization (e.g., a detected conflict) to a control node. The control node may determine a collision management configuration (e.g., to mitigate conflicts), and may provide information associated with the collision management configuration to the network node, to parent network nodes of the network node, to child network nodes of the network node, to adjacent network nodes of the network node, and/or the like. In this way, the control node may alter a resource configuration, a communication configuration, a conflict resolution rule, and/or the like to reduce a likelihood of dropped communications in a multi-hop network.

Figure 4:
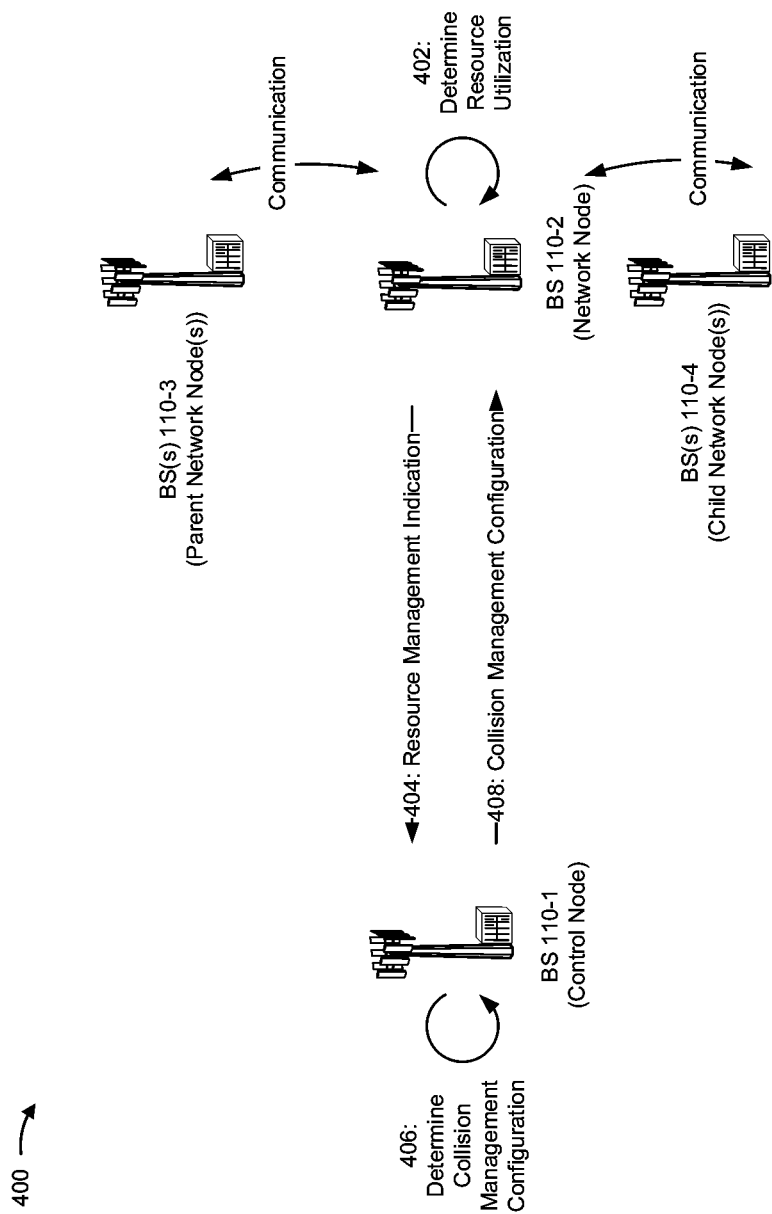
FIG. 4 is a diagram illustrating an example of network node conflict resolution, in accordance with various aspects of the present disclosure.

FIG. 4 is a diagram illustrating an example 400 of network node conflict resolution, in accordance with various aspects of the present disclosure. As shown in FIG. 4, example 400 includes a BS 110-1 (e.g., a control node), a BS 110-2 (e.g., a network node), BS(s) 110-3 (e.g., one or more parent network nodes), BS(s) 110-4 (e.g., one or more child network nodes), and/or the like. In some aspects, a multi-hop network may have additional network nodes, additional links, and/or the like. Although some aspects are described in terms of BSs, network nodes may include other devices, such as UEs (e.g., UE 120), network controllers (e.g., network controller 130), and/or the like.

As further shown in FIG. 4, and by reference number 402, BS 110-2 may determine a resource utilization associated with a multi-hop network. For example, BS 110-2 may determine an inefficiency of allocated resources resulting in conflicts, and may signal the inefficiency of allocated resources to BS 110-1. In some aspects, BS 110-2 may determine the resource utilization based at least in part on a triggering event. For example, BS 1102-may determine the resource utilization based at least in part on detecting a threshold number of dropped communications, detecting a threshold number of conflicts, receiving a request for a resource utilization report from BS 110-1, and/or the like.

In some aspects, BS 110-2 may determine the inefficiency of allocated resources resulting in conflicts based at least in part on monitoring communications with another network node (e.g., BS 110-3, BS 110-4, and/or the like). For example, BS 110-2 may determine a temporary or recurring resource conflict between a plurality of parent network nodes (e.g., BSs 110-3), a temporary or recurring resource conflict between a parent network node (e.g., a BS 110-3) and BS 110-2, and/or the like. Additionally, or alternatively, BS 110-2 may determine a feasibility of using resources in a more efficient manner, such as whether BS 110-2 has an unused capability to avoid conflicts. For example, BS 110-2 may determine whether an SDM capability, an FDM capability, a full-duplex capability, and/or the like is utilizable to avoid one or more detected conflicts.

In some aspects, BS 110-2 may determine a resource conflict metric. For example, BS 110-2 may determine, for a particular time interval, a number of conflicting instances of resource allocations. In this case, based at least in part on the number of conflicting instances in the particular time interval satisfying a threshold, BS 110-2 may be triggered to transmit a report including the resource management indication to BS 110-1.

As further shown in FIG. 4, and by reference number 404, BS 110-2 may provide a resource management indication, and BS 110-1 may receive the resource management indication. For example, based at least in part on determining the resource utilization, BS 110-2 may provide the resource management indication to identify the resource utilization. In some aspects, BS 110-2 may include, in the resource management indication, information identifying an inefficiency of allocated resources. For example, BS 110-2 may provide information identifying resources (e.g., time-division, frequency-division, or space-division resources) over which a conflict or inefficiency is detected as described above. In some aspects, BS 110-2 may provide information identifying a parent node (e.g., a BS 110-3) to enable BS 110-1 to cause an alteration to resource scheduling by the parent node. In some aspects, BS 110-2 may provide the resource management indication via a particular signaling channel. For example, BS 110-2 may provide an RRC message, an F1-AP message, and/or the like to convey the resource management indication.

In some aspects, BS 110-2 may determine a recommended collision management configuration, as described below, and provide information identifying the recommended collision management configuration. For example, BS 110-2 may provide information identifying a new resource configuration (e.g., that resources are marked as not available, as soft available, as hard available, as having a particular communication direction, such as uplink, downlink, flexible, flexible downlink, and/or the like, and/or the like). Additionally, or alternatively, BS 110-2 may provide information identifying a communication configuration (e.g., a transmit power, a timing reference, a beam-forming configuration, a frequency-division separation, a reference signal configuration, a modulation and coding scheme, a rank, and/or the like) for BS 110-2 and/or other BSs (e.g., BS 110-3, BS 110-4, and/or the like).

As further shown in FIG. 4, and by reference number 406, BS 110-1 may determine a collision management configuration. For example, based at least in part on receiving the resource management indication identifying the resource utilization, BS 110-1 may determine the collision management configuration. In some aspects, BS 110-1 may determine, in connection with the collision management configuration, a new or modified resource configuration. Additionally, or alternatively, BS 110-1 may determine, in connection with the collision management configuration, a new or modified communication configuration. Additionally, or alternatively, BS 110-1 may determine, in connection with the collision management configuration, a new or modified conflict resolution rule (e.g., a rule regarding whether a network node is to de-prioritize or back-off a resource when a conflict is detected).

As further shown in FIG. 4, and by reference number 408, BS 110-1 may provide information associated with the collision management configuration, and BS 110-2 may receive the information associated with the collision management configuration. For example, BS 110-2 may receive the information associated with the collision management configuration, and may communicate with BSs 110-3 and/or BSs 110-4 in accordance with the collision management configuration. In some aspects, BS 110-1 may provide the information associated with the collision management configuration to one or more other network nodes. For example, BS 110-1 may provide the information associated with the collision management configuration to a parent network node (e.g., BS 110-3), a child network node (e.g., BS 110-4), an adjacent network node to the network node, and/or the like.

As indicated above, FIG. 4 is provided as an example. Other examples may differ from what is described with respect to FIG. 4.

Figure 5:
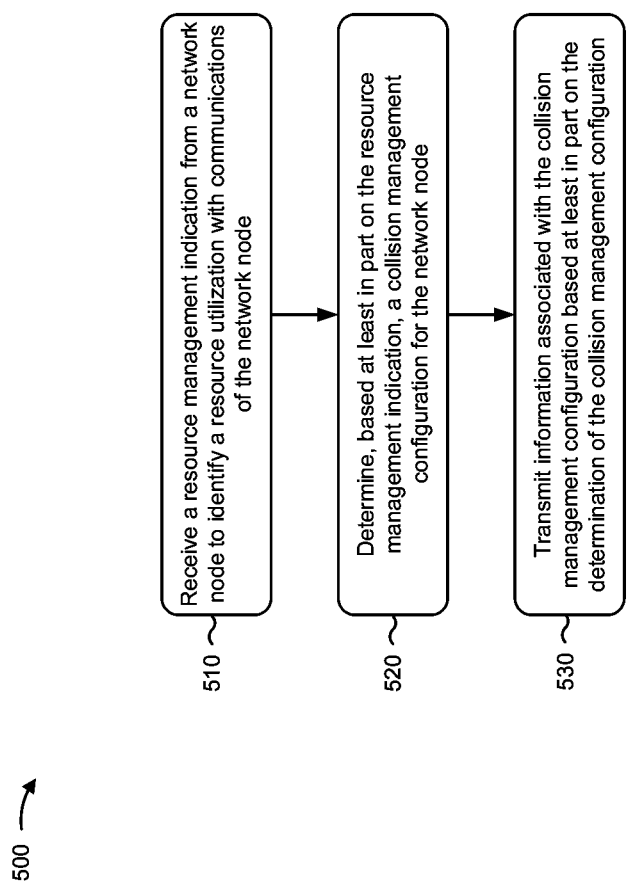
FIG. 5 is a diagram illustrating an example process performed, for example, by a control node, in accordance with various aspects of the present disclosure.

FIG. 5 is a diagram illustrating an example process 500 performed, for example, by a control node, in accordance with various aspects of the present disclosure. Example process 500 is an example where a control node (e.g., a BS 110, such as BS 110-1, a UE 120, and/or the like) performs operations associated with network node conflict resolution.

As shown in FIG. 5, in some aspects, process 500 may include receiving a resource management indication from a network node to identify a resource utilization with communications of the network node (block 510). For example, the control node (e.g., using antenna 234, DEMOD 232, MIMO detector 236, receive processor 238, controller/processor 240, antenna 252, DEMOD 254, MIMO detector 256, receive processor 258, controller/processor 280, and/or the like) may receive a resource management indication from a network node to identify a resource utilization with communications of the network node, as described above. In some aspects, the BS 110 may include means for receiving the resource management indication, such as antenna 234, DEMOD 232, MIMO detector 236, receive processor 238, controller/processor 240, and/or the like. In some aspects, the UE 120 may include means for receiving the resource management indication, such as antenna 252, DEMOD 254, MIMO detector 256, receive processor 258, controller/processor 280, and/or the like.

As further shown in FIG. 5, in some aspects, process 500 may include determining, based at least in part on the resource management indication, a collision management configuration for the network node (block 520). For example, the control node (e.g., using controller/processor 240, controller/processor 280, and/or the like) may determine, based at least in part on the resource management indication, a collision management configuration for the network node, as described above. In some aspects, the BS 110 may include means for determining the collision management configuration, such as controller/processor 240 and/or the like. In some aspects, the UE 120 may include means for determining the collision management configuration, such as controller/processor 280 and/or the like.

As further shown in FIG. 5, in some aspects, process 500 may include transmitting information associated with the collision management configuration based at least in part on the determination of the collision management configuration (block 530). For example, the control node (e.g., controller/processor 240, transmit processor 220, TX MIMO processor 230, MOD 232, antenna 234, controller/processor 280, transmit processor 264, TX MIMO processor 266, MOD 254, antenna 252, and/or the like) may transmit information associated with the collision management configuration based at least in part on the determination of the collision management configuration, as described above. In some aspects, the BS 110 may include means for transmitting the information associated with the collision management configuration, such as controller/processor 240, transmit processor 220, TX MIMO processor 230, MOD 232, antenna 234, and/or the like. In some aspects, the UE 120 may include means for transmitting the information associated with the collision management configuration, such as controller/processor 280, transmit processor 264, TX MIMO processor 266, MOD 254, antenna 252, and/or the like.

Process 500 may include additional aspects, such as any single aspect or any combination of aspects described below and/or in connection with one or more other processes described elsewhere herein.

In a first aspect, the collision management configuration is at least one of a new resource configuration, a modified resource configuration, a new communication configuration, a modified communication configuration, a new conflict resolution rule, or a modified conflict resolution rule.

In a second aspect, alone or in combination with the first aspect, transmitting the information identifying the collision management configuration includes transmitting the information to at least one of the network node, a parent network node of the network node, a child network node of thee network node, or a neighbor network node of the network node.

In a third aspect, alone or in combination with one or more of the first and second aspects, the resource management indication identifies at least one of a resource conflict detected by the network node, a communication capability of the network node, a time interval associated with the resource conflict, or a number of resource conflicts.

In a fourth aspect, alone or in combination with one or more of the first through third aspects, process 500 includes detecting satisfaction of a conflict criterion; and requesting a report identifying the resource utilization based at least in part on the detection of the satisfaction of the conflict criterion. In some aspects, the BS 110 may include means for detecting satisfaction of the conflict criterion and requesting the report, such as controller/processor 240, transmit processor 220, TX MIMO processor 230, MOD 232, antenna 234, and/or the like. In some aspects, the UE 120 may include means for detecting satisfaction of the conflict criterion and requesting the report, such as controller/processor 280, transmit processor 264, TX MIMO processor 266, MOD 254, antenna 252, and/or the like.

In a fifth aspect, alone or in combination with one or more of the first through fourth aspects, receiving the resource management indication includes receiving the resource management indication as a response to the request of the report identifying the resource utilization.

In a sixth aspect, alone or in combination with one or more of the first through fifth aspects, the resource management indication includes an indication of at least one of a type of resource associated with a conflict, an identity of a parent node of the network node, or a recommendation for the collision management configuration.

In a seventh aspect, alone or in combination with one or more of the first through sixth aspects, the resource management indication is received via at least one of a radio resource control message or an F1-AP interface message.

In an eighth aspect, alone or in combination with one or more of the first through seventh aspects, receipt of the resource management indication is based at least in part on satisfaction of the conflict criterion.

In a ninth aspect, alone or in combination with one or more of the first through eighth aspects, the conflict criterion is associated with at least one of a minimum time interval, or a minimum number of resource conflicts.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
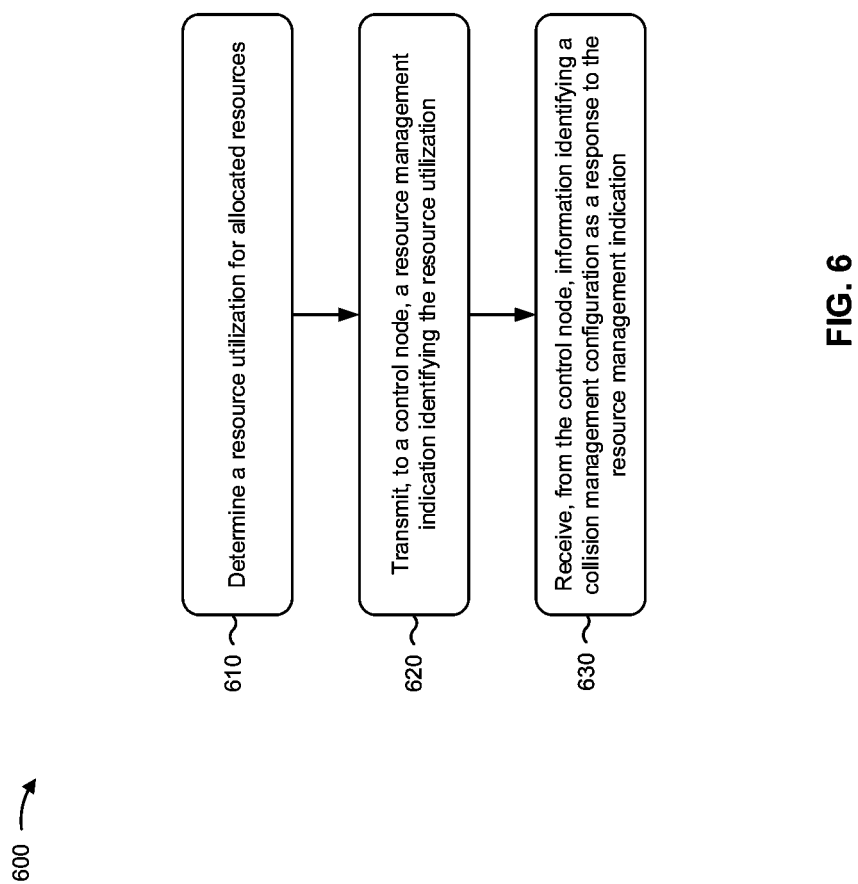
FIG. 6 is a diagram illustrating an example process performed, for example, by a network node, in accordance with various aspects of the present disclosure.

FIG. 6 is a diagram illustrating an example process 600 performed, for example, by a network node, in accordance with various aspects of the present disclosure. Example process 600 is an example where a network node (e.g., a BS 110, such as BS 110-2, a UE 120, and/or the like) performs operations associated with network node conflict resolution.

As shown in FIG. 6, in some aspects, process 600 may include determining a resource utilization for allocated resources (block 610). For example, the network node (e.g., using controller/processor 240, controller/processor 280, and/or the like) may determine a resource utilization for allocated resources, as described above. In some aspects, the BS 110 may include means for determining the resource utilization, such as controller/processor 240 and/or the like. In some aspects, the UE 120 may include means for determining the resource utilization, such as controller/processor 280 and/or the like.

As further shown in FIG. 6, in some aspects, process 600 may include transmitting, to a control node, a resource management indication identifying the resource utilization (block 620). For example, the network node (e.g., using controller/processor 240, transmit processor 220, TX MIMO processor 230, MOD 232, antenna 234, controller/processor 280, transmit processor 264, TX MIMO processor 266, MOD 254, antenna 252, and/or the like) may transmit, to a control node, a resource management indication identifying the resource utilization, as described above. In some aspects, the BS 110 may include means for transmitting the resource management indication, such as controller/processor 240, transmit processor 220, TX MIMO processor 230, MOD 232, antenna 234, and/or the like. In some aspects, the UE 120 may include means for transmitting the resource management indication, such as controller/processor 280, transmit processor 264, TX MIMO processor 266, MOD 254, antenna 252, and/or the like.

As further shown in FIG. 6, in some aspects, process 600 may include receiving, from the control node, information identifying a collision management configuration as a response to the resource management indication (block 630). For example, the network node (e.g., using antenna 234, DEMOD 232, MIMO detector 236, receive processor 238, controller/processor 240, antenna 252, DEMOD 254, MIMO detector 256, receive processor 258, controller/processor 280, and/or the like) may receive, from the control node, information identifying a collision management configuration as a response to the resource management indication, as described above. In some aspects, the BS 110 may include means for receiving the information identifying the collision management configuration, such as antenna 234, DEMOD 232, MIMO detector 236, receive processor 238, controller/processor 240, and/or the like. In some aspects, the UE 120 may include means for receiving the information identifying the collision management configuration, such as antenna 252, DEMOD 254, MIMO detector 256, receive processor 258, controller/processor 280, and/or the like.

Process 600 may include additional aspects, such as any single aspect or any combination of aspects described below and/or in connection with one or more other processes described elsewhere herein.

In a first aspect, the collision management configuration is at least one of a new resource configuration, a modified resource configuration, a new communication configuration, a modified communication configuration, a new conflict resolution rule, or a modified conflict resolution rule.

In a second aspect, alone or in combination with the first aspect, the resource management indication identifies at least one of a resource conflict detected by the network node, a communication capability of the network node, a time interval associated with the resource conflict, or a number of resource conflicts.

In a third aspect, alone or in combination with one or more of the first and second aspects, process 600 includes receiving, from the control node, a request for a report identifying the resource utilization; and transmitting the resource management indication as a response to the request for the report identifying the resource utilization. In some aspects, the BS 110 includes means for receiving the request and means for transmitting the resource management indication, such as controller/processor 240, transmit processor 220, TX MIMO processor 230, MOD 232, antenna 234, DEMOD 232, MIMO detector 236, receive processor 238, and/or the like. In some aspects, the UE 120 may include means for receiving the request and means for transmitting the resource management indication, such as antenna 252, DEMOD 254, MIMO detector 256, receive processor 258, controller/processor 280, transmit processor 264, TX MIMO processor 266, MOD 254, and/or the like.

In a fourth aspect, alone or in combination with one or more of the first through third aspects, process 600 includes detecting satisfaction of a conflict criterion; and transmitting the resource management indication based at least in part on the detection of the satisfaction of the conflict criterion. In some aspects, the BS 110 includes means for detecting satisfaction of the conflict criterion and transmitting the resource management indication, such as controller/processor 240, transmit processor 220, TX MIMO processor 230, MOD 232, antenna 234, DEMOD 232, MIMO detector 236, receive processor 238, and/or the like. In some aspects, the UE 120 may include means for detecting satisfaction of the conflict criterion and transmitting the resource management indication, such as antenna 252, DEMOD 254, MIMO detector 256, receive processor 258, controller/processor 280, transmit processor 264, TX MIMO processor 266, MOD 254, and/or the like.

In a fifth aspect, alone or in combination with one or more of the first through fourth aspects, the conflict criterion is associated with at least one of a minimum time interval, or a minimum number of resource conflicts.

In a sixth aspect, alone or in combination with one or more of the first through fifth aspects, the conflict criterion is determined based at least in part on a received indication from at least one of the control node or a parent node.

In a seventh aspect, alone or in combination with one or more of the first through sixth aspects, the conflict criterion is determined based at least in part on a preconfigured value.

In an eighth aspect, alone or in combination with one or more of the first through seventh aspects, the resource management indication includes an indication of at least one of a type of resource associated with a conflict, an identity of a parent node of the network node, or a recommendation for the collision management configuration.

In a ninth aspect, alone or in combination with one or more of the first through eighth aspects, the resource management indication is transmitted via at least one of a radio resource control message or an F1-AP interface message.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
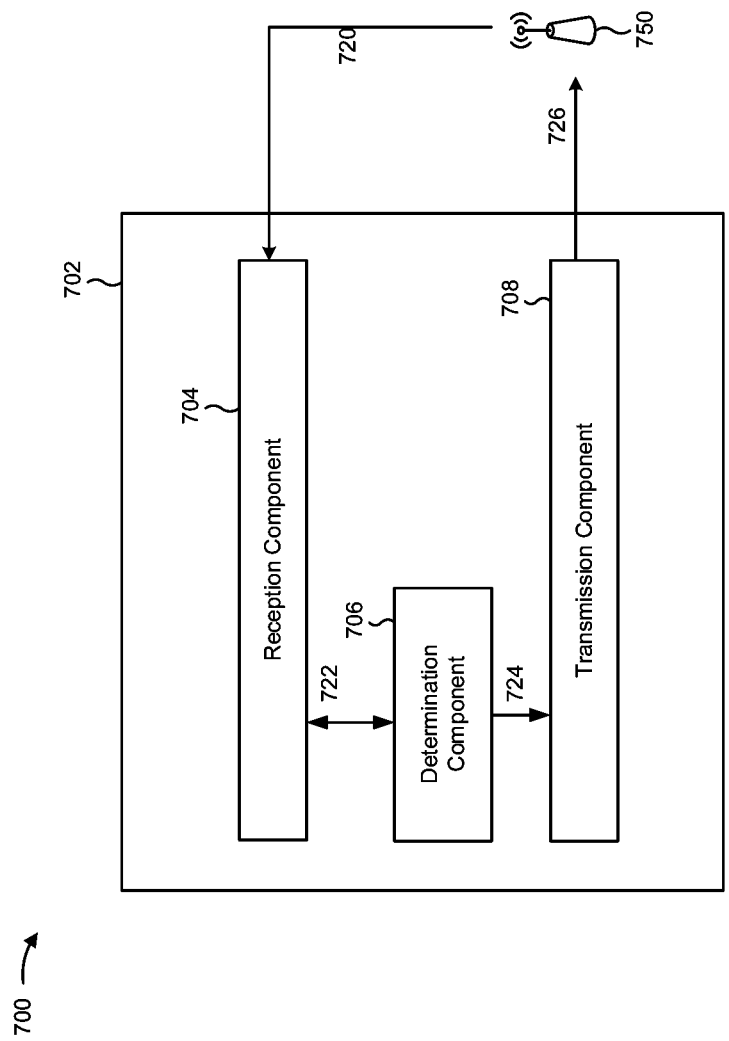
FIG. 7 is a conceptual data flow diagram illustrating the data flow between different modules/means/components in an example apparatus, in accordance with various aspects of the present disclosure.

FIG. 7 is a conceptual data flow diagram 700 illustrating the data flow between different modules/means/components in an example apparatus 702. The apparatus 702 may be a node (e.g., a control node, such as BS 110-1, a network node, such as BS 110-2, a BS 110, a UE 120, and/or the like). In some aspects, the apparatus 702 includes a reception component 704, a determination component 706, and/or a transmission component 708.

Reception component 704 may receive data 720 from a BS 750 (e.g., a network node, a control node, and/or the like) identifying a resource management indication, a collision management configuration, a communication (e.g., based at least in part on which a resource utilization may be determined), and/or the like. For example, reception component 704 may, when apparatus 702 is a network node, receive a collision management configuration to configure apparatus 702 to communicate in accordance with the collision management configuration. Additionally, or alternatively, when apparatus 702 is a control node, reception component 704 may receive a resource management indication that may trigger apparatus 702 to determine a collision management configuration.

Determination component 706 may receive data 722 from reception component 704 to enable a determination and/or provide data 722 to reception component 704 based at least in part on a result of a determination. For example, when apparatus 702 is a control node, determination component 706 may receive information identifying a resource utilization, and may determine a collision management configuration. Additionally, or alternatively, when apparatus 702 is a network node, determination component 706 may configure reception component 704 to receive information in accordance with the collision management configuration.

Transmission component 708 may receive data 724 identifying information for transmission to BS 750 as data 726. For example, transmission component 708 may receive information triggering transmission component 708 to transmit a request for a report on resource utilization. Additionally, or alternatively, transmission component 708 may receive information triggering transmission component 708 to transmit information associated with a collision management configuration. Additionally, or alternatively, transmission component 708 may receive information triggering transmission component 708 to transmit a resource management indication.

The apparatus 702 may include additional components that perform each of the blocks of the algorithm in the aforementioned process 500 of FIG. 5, process 600 of FIG. 6, and/or the like. Each block in the aforementioned process 500 of FIG. 5, process 600 of FIG. 6, and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of components (e.g., one or more components) shown in FIG. 7 may perform one or more functions described as being performed by another set of components shown in FIG. 7.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a control node, comprising:

transmitting, to a network node, information associated with a conflict criterion, the conflict criterion associated with, for a particular time interval, a number of resource conflicts satisfying a threshold number of resource conflicts;

19 based at least in part on satisfaction of the conflict criterion, requesting a report from the network node identifying a resource utilization with communications of the network node;

receiving a resource management indication from the network node to identify the resource utilization,
wherein the resource management indication identifies a resource conflict detected by the network node, and
wherein the control node is configured to be coupled to a core network via a backhaul link and the network node is at a lower level in a hierarchical topology than the control node;

determining, based at least in part on the resource management indication, a collision management configuration for the network node; and transmitting information associated with the collision management configuration based at least in part on the determination of the collision management configuration.

2. The method of claim 1, wherein the collision management configuration is at least one of:
a new resource configuration,
a modified resource configuration,
a new communication configuration,
a modified communication configuration,
a new conflict resolution rule, or
a modified conflict resolution rule.

3. The method of claim 1, wherein transmitting the information associated with the collision management configuration comprises:
transmitting the information to at least one of:
the network node,
a parent network node of the network node,
a child network node of the network node, or
a neighbor network node of the network node.

4. The method of claim 1, wherein the resource management indication further identifies at least one of:
a communication capability of the network node,
a time interval associated with the resource conflict, or
a number of resource conflicts.

5. The method of claim 1, wherein receiving the resource management indication comprises:
receiving the resource management indication as a response to requesting the report identifying the resource utilization.

6. The method of claim 1, wherein the resource management indication includes an indication of at least one of:
a type of resource associated with the resource conflict,
an identity of a parent node of the network node, or
a recommendation for the collision management configuration.

7. The method of claim 1, wherein the resource management indication is received via at least one of a radio resource control message or an F1-AP interface message.

8. A method of wireless communication performed by a network node, comprising:
receiving information associated with a conflict criterion, the conflict criterion associated with, for a particular time interval, a number of resource conflicts satisfying a threshold number of resource conflicts;
based at least in part on satisfaction of the conflict criterion, receiving, from a control node, a request for a report to identify a resource utilization for allocated resources,

20 wherein the control node is configured to be coupled to a core network via a backhaul link and the network node is at a lower level in a hierarchical topology than the control node;

determining the resource utilization;
transmitting, to the control node, a resource management indication identifying the resource utilization, wherein the resource management indication identifies a resource conflict detected by the network node; and
receiving, from the control node, information identifying a collision management configuration as a response to the resource management indication.

9. The method of claim 8, wherein the collision management configuration is at least one of:
a new resource configuration,
a modified resource configuration,
a new communication configuration,
a modified communication configuration,
a new conflict resolution rule, or
a modified conflict resolution rule.

10. The method of claim 8, wherein the resource management indication further identifies at least one of:
a communication capability of the network node,
a time interval associated with the resource conflict, or
a number of resource conflicts.

11. The method of claim 8, further comprising:
transmitting the resource management indication as a response to the request for the report identifying the resource utilization.

12. The method of claim 8, wherein the conflict criterion is determined based at least in part on a received indication from at least one of the control node or a parent node.

13. The method of claim 8, wherein the conflict criterion is determined based at least in part on a preconfigured value.

14. The method of claim 8, wherein the resource management indication includes an indication of at least one of:
a type of resource associated with the resource conflict,
an identity of a parent node of the network node, or
a recommendation for the collision management configuration.

15. The method of claim 8, wherein the resource management indication is transmitted via at least one of a radio resource control message or an F1-AP interface message.

16. A control node for wireless communication, comprising:
one or more memories; and
one or more processors coupled to the one or more memories, the one or more processors individually or collectively configured to:
transmit, to a network node, information associated with a conflict criterion, the conflict criterion associated with, for a particular time interval, a number of resource conflicts satisfying a threshold number of resource conflicts;
based at least in part on satisfaction of the conflict criterion, request a report from the network node identifying a resource utilization with communications of the network node;
receive a resource management indication from the network node to identify the resource utilization,
wherein the resource management indication identifies a resource conflict detected by the network node, and
wherein the control node is configured to be coupled to a core network via a backhaul link and the network node is at a lower level in a hierarchical topology than the control node;

determine, based at least in part on the resource management indication, a collision management configuration for the network node; and transmit information associated with the collision management configuration based at least in part on the determination of the collision management configuration.

17. The control node of claim 16, wherein the collision management configuration is at least one of:
a new resource configuration,
a modified resource configuration,
a new communication configuration,
a modified communication configuration,
a new conflict resolution rule, or
a modified conflict resolution rule.

18. The control node of claim 16, wherein the one or more processors, when transmitting the information associated with the collision management configuration, are configured to:
transmit the information to at least one of:
the network node,
a parent network node of the network node,
a child network node of the network node, or
a neighbor network node of the network node.

19. The control node of claim 16, wherein the resource management indication further identifies at least one of:
a communication capability of the network node,
a time interval associated with the resource conflict, or
a number of resource conflicts.

20. A network node for wireless communication, comprising:
one or more memories; and
one or more processors coupled to the one or more memories, the one or more processors individually or collectively configured to:
receive information associated with a conflict criterion, the conflict criterion associated with, for a particular time interval, a number of resource conflicts satisfying a threshold number of resource conflicts;
based at least in part on satisfaction of the conflict criterion, receive, from a control node, a request for a report to identify a resource utilization for allocated resources,
wherein the control node is configured to be coupled to a core network via a backhaul link and the network node is at a lower level in a hierarchical topology than the control node;
determine the resource utilization;
transmit, to the control node, a resource management indication identifying the resource utilization, wherein the resource management indication identifies a resource conflict detected by the network node; and
receive, from the control node, information identifying a collision management configuration as a response to the resource management indication.

21. The network node of claim 20, wherein the collision management configuration is at least one of:
a new resource configuration,
a modified resource configuration,
a new communication configuration,
a modified communication configuration,
a new conflict resolution rule, or
a modified conflict resolution rule.

22. The network node of claim 20, wherein the resource management indication further identifies at least one of:
a communication capability of the network node,
a time interval associated with the resource conflict, or
a number of resource conflicts.

23. The network node of claim 20, wherein the one or more processors are further configured to:
transmit the resource management indication as a response to the request for the report identifying the resource utilization.

24. The method of claim 1, wherein the collision management configuration comprises a modified communication configuration.

25. The method of claim 1, wherein the collision management configuration includes a beam-forming configuration.

26. The method of claim 8, wherein the collision management configuration comprises a communication configuration indicating a frequency-division separation.

27. The method of claim 8, wherein the collision management configuration includes a modified resource configuration.

28. The control node of claim 16, wherein the collision management configuration comprises a modified communication configuration.

29. The control node of claim 28, wherein the modified communication configuration includes a beam-forming configuration.

30. The control node of claim 28, wherein the modified communication configuration indicates a frequency-division separation.

* * * * *